Aug. 2, 1927.

J. M. COOTE 1,637,472

ELECTRICAL TESTING APPARATUS

Filed June 21, 1921

Inventor
John Maxwell Coote
By his Attorney

Patented Aug. 2, 1927.

1,637,472

UNITED STATES PATENT OFFICE.

JOHN MAXWELL COOTE, OF ELIZABETH, NEW JERSEY, ASSIGNOR, BY DIRECT AND MESNE ASSIGNMENTS, TO COOTE PRODUCTS CORPORATION, OF NEW YORK, N. Y., A CORPORATION OF NEW YORK.

ELECTRICAL TESTING APPARATUS.

Application filed June 21, 1921. Serial No. 479,332.

The invention relates to a testing device for quickly and conveniently determining the condition of various electrical apparatus, for example such as fuses either of the plug, ferrule or knife blade type, as well as lamps, bells, coils, etc.

More particularly, the invention consists of a suitable container having an electrical responsive device, for example an electric lamp, associated therewith and located preferably at one end, a cell or battery within the container for energizing said device and means adapted, when connected with the article to be tested, to close the circuit to the lamp or the like and effect thereby an indication of the condition of the said article. In a co-pending application, Serial No. 429,856, I have set forth a somewhat similar device; and it is the object of the present invention to afford a more simple apparatus and one which is more readily portable; also, an apparatus which in addition to its function of testing various devices as set forth, may be employed as a lamp. This will enable the device, for example, to be conveniently used in exploring darkened places, as in replacing fuses, while allowing also, of determining the particular fuse which may have failed.

The nature of the invention, however, will best be understood when described in connection with the accompanying drawings, in which—

Similar characters of reference designate corresponding parts thruout the several views.

Figure 1:
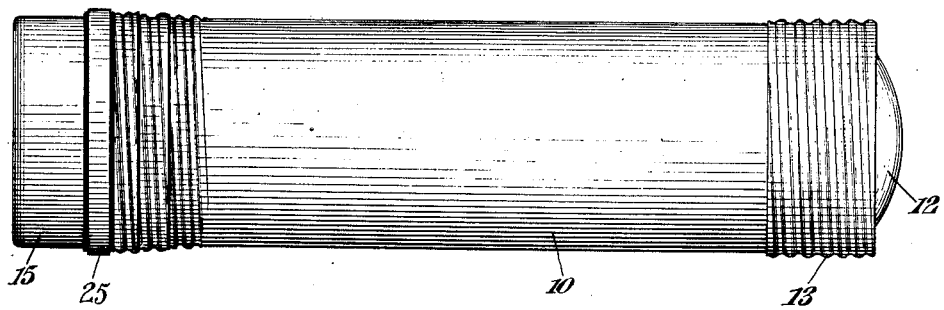
Fig. 1 illustrates the improved testing device in elevation.
Figure 2:
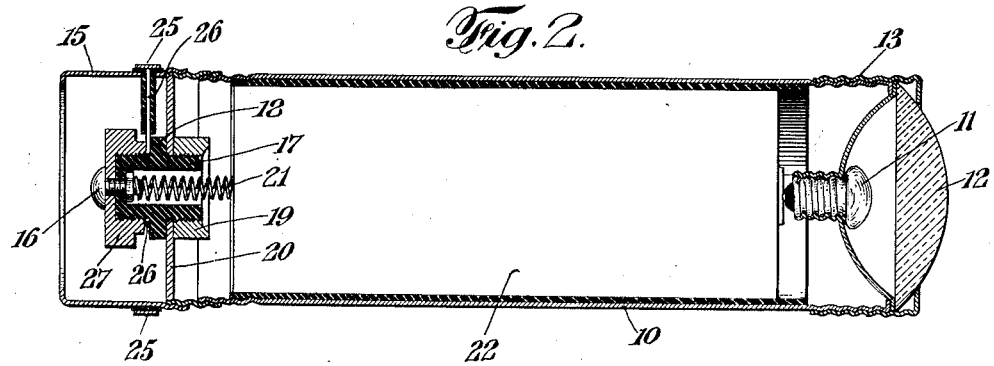
Fig. 2 is a longitudinal section therethru.
Figure 3:
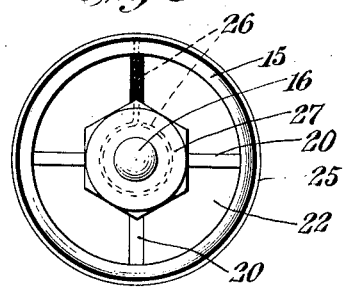
Fig. 3 is an end view.

Referring to the drawings, 10 designates a suitable metallic container, preferably cylindrical, and more or less of the well-known type having at one end a lamp 11 covered by a lens 12 thru which the light of the lamp is projected, the same being held to the container 10 by a screw cap 13.

Contrary to the usual construction, however, the opposite end of the container is open, or rather, provided with a cylindrical contact making receptacle 15 which is, for convenience in manufacture, preferably arranged in two parts to be screwed on to the said end of the receptacle and allow of adjustment as a whole relatively to the container 10 for the purpose hereinafter set forth. Axially disposed with respect to said receptacle 15 and at the proper distance within same is a contact button 16, said receptacle and button being so designed as to receive fuse plugs and the like and effect contact with the wall of the receptacle 15 and the central portion with the button 16. Button 16 is mounted on an insulation bushing 17 having a flange or hub 18 intermediate its ends, the bushing being held by a nut 19 to a spider or transverse member 20 carried by the one part of the receptacle 15. The button 16 is in electrical connection thru a spring 21 with the metallic covering or end as one terminal of the battery or cell 22 and serves also to hold the latter in place within the container 10, said cell or battery providing the source of power for testing, as in energizing the lamp 11. In this manner, a fuse plug may readily be tested by simply inserting same in the receptacle 15; and, if intact, will cause the lamp 11 to burn.

Should it be desired to test other devices, as ferrule or knife blade fuses, bells, coils, etc., there is provided about the other part of the receptacle 15 an additional contact member in the nature of a circular member or band 25 insulated therefrom but in electrical contact, thru a conductor 26 or the like, with the one terminal of the battery. Conductor 26 is shown as brought around the outer end of bushing 17 and is held to its flange 18 by a nut 27 upon which the button 16 bears and serves thus also to place said conductor in electrical connection with the cell or battery 22. If then the terminals of such other device or devices be placed in contact respectively with the band 25 and the outer surface of the metal container 10, the circuit will be closed therethru; and, if intact, the lamp will be caused to burn.

The apparatus, moreover, is suitable for use as a means of illumination, since by screwing down the receptacle 15, contact may be effected between the outer face of nut 19 and the cell or battery 22 and the circuit closed to the lamp.

It will be understood, of course, that while thus operating, the device is not in condition for effecting tests. However, as soon as the nut 19 is again separated from the surface of the cell or battery, the apparatus is in condition for use as a testing device. In this manner, a very satisfactory and conveniently operated test apparatus is afforded, whereby to test apparatus not only of the screw contact type but also such having terminals separated longitudinally and of various distances, said apparatus in addition being suitable for use as a lamp.

I claim:—

1. Combined testing apparatus and flash lamp, comprising a metallic container provided at one end with a lamp and at the opposite end with a rotatable contact-making test receptacle adapted to receive directly the member to be tested, and an electric battery included between said ends, one pole being electrically connected to the lamp and the other adapted to be connected with the container thru said rotatable means when the same is rotated sufficiently.

2. Combined testing apparatus and flash lamp, comprising a metallic container provided at one end with a lamp, a rotatable test receptacle at the opposite end adapted to close the circuit to the lamp, an electric battery included between said ends, one pole being electrically connected to the lamp and the other to one element of the rotatable testing means, and said means having a further element in electrical connection with the container and adapted to be connected with the battery when the testing means is rotated sufficiently.

3. Testing apparatus, comprising a metallic container provided at one end with a lamp, an electric battery in said container for energizing the lamp, a rotatable contact-making receptacle at the opposite end, a spring in electrical connection with a portion of the contact-making receptacle and with one of the battery terminals, the other terminal being connected with the lamp and thru same with the container, and a contact making portion carried by the receptacle and connected with the first-named of said battery terminals.

4. Testing apparatus, comprising a metallic container provided at one end with a lamp, an electric battery in said container for energizing the lamp, a movable contact-making receptacle at the opposite end of the container, an insulation bushing carried thereby, and a contact button within the receptacle electrically connected with said battery and carried by said bushing.

Signed at New York, in the county of New York and State of New York, this 20th day of June A. D. 1921.

JOHN MAXWELL COOTE.